Patented Apr. 3, 1934

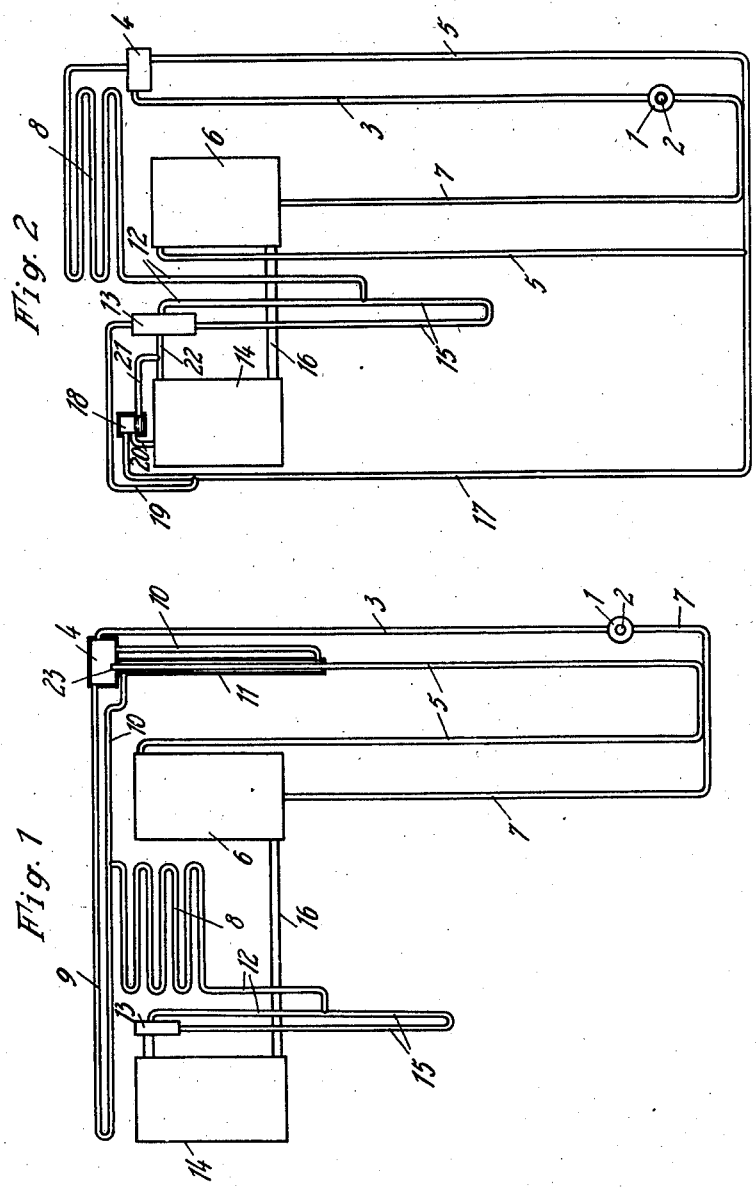

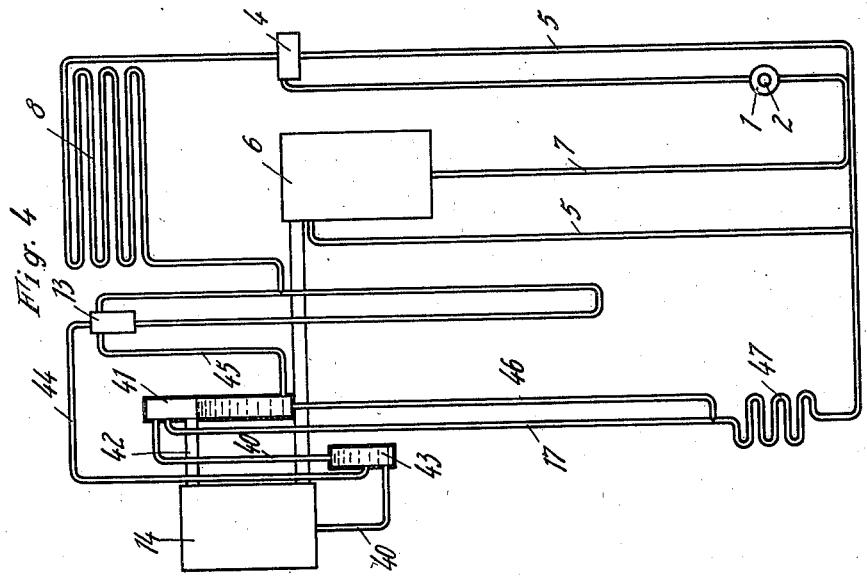

1,953,329

UNITED STATES PATENT OFFICE 1,953,329

METHOD AND APPARATUS FOR PREVENTING THE LIQUEFIED REFRIGERANT FROM FREEZING

Edmund Altenkirch, Neuenhagen, near Berlin, Germany, assignor, by mesne assignments, to The Hoover Company, North Canton, Ohio, a corporation of Ohio Application January 16, 1932, Serial No. 536,980
In Germany January 22, 1931

11 Claims. (Cl. 62—119.5)

My invention relates to absorption refrigerating apparatus, and more particularly to a method and apparatus for preventing the liquefied refrigerating medium in an evaporator of a continuous absorption apparatus from freezing.

To operate a continuous absorption refrigerating apparatus, various absorption solutions may be employed, such, for instance, as ammonia, dissolved in water, diluted sulphuric acid or alkaline liquor or lye. The refrigerating medium in the first case is ammonia, whereas in the last-two mentioned cases it is water. While the solidifying point of liquid ammonia lies at —80° C., pure water will solidify at 0° C.

By using water and other substances with a comparatively high-freezing point, it may occur that the liquefied refrigerating agent freezes within the evaporator. Also in the case of ammonia and other substances with a comparatively low-freezing point this may happen, in the event of the evaporator being operated at extremely low temperatures.

The aforesaid drawback may, however, be avoided according to my invention, if the liquefied refrigerant be mixed with a comparatively slight amount of the absorbing agent used in the apparatus and/or if the mixture be maintained. The usual absorbing agents have the property to cause the freezing point to lower, in case a small amount thereof is added to the liquid which they are intended to absorb. Care should only be taken to slightly concentrate the absorbing agent in the evaporator so as to influence the vapor pressure of the solution to a small extent only.

If the condensate, instead of entering at a point below the level of the liquid contained in the evaporator, should enter the vapor chamber of the evaporator, it may also occur, in the case of pure condensate that the point at which the supply pipe enters the evaporator freezes. It has been found that it is particularly convenient to add the necessary amount of absorbing agent to the liquefied refrigerating agent before it passes into the evaporator. To this end, the liquid which has not been evaporated, but which has collected in the evaporator may be utilized. The absorption solution to be added to the liquefied refrigerating medium may, however, be also derived from the absorption solution circulating in the absorber system (i. e. between the generator and absorber), and preferably from the solution flowing to the absorber. It is an advantage to convey the absorption solution to be added to the condensate in such a manner as to cause the solution rather than the condensate itself, to rise into the evaporator. In this way, it is possible to control the quantity of solution to be added. To raise the absorption solution, the vapor of the refrigerating agent may be employed, which vapor is generated from the condensate under a pressure lying between the pressure of evaporation and of condensation. However, the condensate itself may be used to convey the absorption solution; for instance, by bringing both liquids to a point lying so low below the level of a column of liquid formed of the absorption solution as to cause the condensate to lift into the evaporator small amounts of the absorption solution.

The condensate to be supplied to the evaporator, may be withdrawn from a vessel disposed in the condensate conduit between the condenser and evaporator, in which vessel the vapor may be developed from the condensate; for instance by releasing the vapor pressure which lies between that of condensation and evaporation. The vapor developed in the said vessel may then be carried off by means of a special vapor conduit, which terminates in the evaporator, for instance at a point below the column of liquid contained in an intermediate vessel facing the evaporator. In this manner, it is possible to lift the absorption solution to be added to the condensate to a higher level, and thereby effectively prevent the condensate conduit from freezing.

At any rate, it is desirable to so control the percentage of the absorption solution admixed to the liquefied refrigerating medium that the desired concentration in the evaporator be attained, and permanently maintained. This may be accomplished by leading the connecting pipe from a gas separator arranged above the generator or expeller to the condenser, the point at which the connecting pipe enters the condenser being somewhat higher than the point from which the solution flows from the gas separator to the absorber. Should the liquid conduit in this case be given the form of a U-shaped pipe, in the rising portion of which heat is imparted to the absorption solution, whereas its descending portion is exposed to a regulable cooling effect, the desired object may be attained with great accuracy.

With the aid of a device according to my invention, it is possible to charge the evaporator at all times with an accurately concentrated mixture of liquefied refrigerating medium and absorbing medium, and independently of the working conditions of the refrigerating apparatus, as, for instance the extent of heating the generator and the amount the condenser is cooled. The device may also be disposed in such a manner that a pure condensate normally reaches the evaporator, and only in the event of the condensate freezing in the supply conduit, sufficient absorption solution is then added thereto to thaw off the ice.

With the foregoing and other objects in view, my invention may embody numerous modified forms of construction, some of which are hereinafter described and illustrated in the accompanying drawings.

Referring to Figure 1, 1 denotes a generator or expeller heated by a cartridge heating element 2. The water vapor, generated in the generator 1 from the aqueous solution of alkaline liquor or lye, rises through the conduit 3 together with the absorption solution into a gas separator 4 in which the vapor of the refrigerant is separated from the solution, and thence the solution is supplied to the absorber 6 through a U-shaped conduit 5. The solution enriched again of water, flows back to the generator 1 through another U-shaped conduit 7 which forms with the conduit 5 a temperature exchanger.

By means of vapor conduit 9, and U-shaped liquid conduit 10, the separator 4 is connected to the condenser 8, which is in the form of a reversely bent conduit. The descending portion of the U-shaped conduit 10 leaves the separator 4 at a point which lies lower than the overflow, as indicated at 23, of the conduit 5 which conveys the absorption solution to the absorber 6. The upper end of conduit 10 terminates in the condenser 8 at a point which lies somewhat higher than the said overflow. The rising portion of the conduit 10 comprises a jacket-like enlargement 11 enclosing the descending portion of the conduit 5, with the result that both conduits effect a heat exchange with each other so that the absorption solution flowing through the descending portion of the conduit 10 from the separator 4 is cooled off by the air but is heated in the enclosure 11 by means of the absorption solution flowing through the descending portion of the conduit 5. The specific weight of the solution will, consequently, be smaller in the rising portion of the conduit 10, and a slight amount of the solution reaches the condenser 8, provided there exists an adequate difference in temperature between both portions of the U-shaped conduit 10.

From the lower end of the condenser 8, the condensate is allowed to pass, through a U-shaped conduit 12, into the separating vessel 13, whence it reaches the evaporator 14. The lowest point of the U-shaped conduit 12 is connected to the lower end of the separating vessel 13 through another conduit 15 descending beyond the said point. From the lower end of the evaporator 14, the evaporated fluid passes through the pipe 16 into the absorber 6. This pipe serves at the same time to convey the liquid which has not been evaporated back into the evaporator 14 to the absorption system.

As above described, a certain amount of the absorption solution contained in the U-shaped conduit 10 passes into the condenser 8, and is mixed together with the liquefied refrigerating agent as soon as the difference in temperature between the solution, heated in the enclosure 11, and that cooled off in the descending portion of the conduit 10 has attained a given limit value. The cooling process of the solution in the descending portion of the conduit 10 requires a certain time, so that the quantity of solution conveyed to the condenser per unit of time will at all events be small. The unit of time is the smaller, the less the descending portion is protected against the radiation of heat. By varying the amount of insulation, it is, therefore, possible to predetermine the degree of the heat. The cooling of the absorption solution in the descending portion of the conduit 10, and the quantity of solution carried off may be regulated at will within certain limits.

As a result of the slight difference in the specific weight of the cooled as well as of the heated absorption solution, brought about by the above described cooling and heating process, the point at which the conduit 10 enters the condenser 8 may lie but a few millimeters or centimeters higher than the overflow of the conduit 5 in the separator 4. Consequently, the operation of the device disclosed in Figure 1 depends upon the manner in which the apparatus is arranged, so that a slight inclination may, under circumstances, be disadvantageous. It is, therefore, convenient to dispose the overflow and the point from which the solution passes into the condenser 8 close to each other. A device, which is less sensitive in this respect, is represented in Figure 2. In this modified form of construction, the absorption solution is not added to the condensate contained in the condenser 8, but it is carried off at a lower point through the conduit 5 leading from the separator 4 to the absorber 6, and lifted into the evaporator by the vapor of the refrigerant, which vapor is developed from the condensate under a pressure lying between the pressure of evaporation and condensation. This, however, occurs in this form of construction only when the means for normally supplying condensate to the evaporator 14 is obstructed, owing to the freezing of the fluid, i. e., when the addition of solution is, therefore, desirable.

The parts designated with the same reference numerals in Fig. 2 are the same as those in Fig. 1 and need not, therefore, be reexplained. The device in Figure 2 differs from that shown in Figure 1 in the following essential features:

From the U-shaped liquid conduit 5 which conveys the absorption solution from the separator 4 to the absorber 6, a pipe 17 is branched off at the lower end and is connected to the vessel 18 disposed above the evaporator 14. The vapor conduit 19, which runs from the upper part of the separating vessel 13, arranged in the condensate pipe system between the condenser and absorber, is connected to the upper end of the rising pipe 17. As will be seen from Figure 2, the vessel 18 is connected to the evaporator 14 through a gas conduit 20. It is also connected, through a liquid conduit 21 to a pipe 22 through which the condensate passes from the separating member 13 into the evaporator 14.

It is assumed that pure water is supplied to the evaporator 14 through the comparatively small conduit 22. Should the temperature within the evaporator fall below 0° C., the condensate in the conduit 22 will freeze. As a result thereof, the vapor developing in the separating vessel 13 has no outlet, and the pressure therein will be increased to a value which is determined by the column of liquid contained in the conduit 17. The level of this column stands above the point at which the gas conduit 19 enters, corresponding in height to that in the communicating conduit 5. As soon as this pressure is attained, therefore, vapor passes through the conduit 19 into the rising portion of the conduit 17 and lifts the absorption solution from the latter into the vessel 18. The absorption solution passes through the conduit 21 into the conduit 22 and causes here a defrosting of the ice. Should the defrosting process not take place in a sufficiently rapid manner, the absorption solution collecting in the vessel 18 may pass through the conduit 20 into the evaporator 14. As the condenser 8 supplies continuously an additional amount of condensate, the latter passes into the evaporator 14 through the conduit 19. The condensate thus dilutes the absorption solution in the upper portion of the conduit 17, and the mixture passes through the vessel 18 into the evaporator 14. The condensate will then flow either through the conduit 21, or in case the latter is obstructed through the conduit 20.

A further embodiment of my invention is illustrated in Figure 3. Here the quantity of absorption solution to be supplied to the evaporator is not conveyed to the evaporator by means of the vapor of the refrigerating medium but only by the liquefied refrigerant itself. Also in this case like reference numerals denote like parts.

The modified forms of construction illustrated in Figures 1 and 2 differ from that shown in Figure 3 in that the condensate is not directly supplied to the evaporator 14 from the separating vessel 13, but passes first through a condensate conduit 30 descending from the separating vessel 13. The conduit 30 is connected to the rising portion of the liquid conduit 17 at a point which is lower than the point at which the conduit 5 terminates in the absorber 6, the liquid conduit 17 being a branch off of the conduit 5 which supplies the absorption solution to the absorber 6. The portion 31 of the conduit 17 above the point where the conduit 30 is connected has a greater cross-section than the portion below the said point so as to prevent the gas bubbles which are being developed from driving off the solution from the conduit. The conduit 31 terminates in an intermediate vessel 32 near the evaporator 14. The liquid passes from the vessel 32 into the evaporator 14 through a connecting pipe 33. The vapor conduit 19 descending from the separating vessel 13 terminates in the intermediate vessel 32 below a column of liquid formed of the fluid contained in the vessel 32. In this way the separating vessel 13 is prevented from freezing.

The operation of the last-described device is as follows:

So long as no condensate passes through the conduit 30, the level of the solution in the conduit 31, in the case of an equal concentration, is as high as in the conduit 5. As a result thereof, a strongly concentrated solution cannot rise beyond the point (as shown in dashes) at which the conduit 5 enters the absorber 6, and cannot, therefore, reach the evaporator 14. The condensate passing through the conduit 30 dilutes the absorption solution, thus decreasing the specific gravity thereof in the conduit 31. The level of the liquid, consequently, rises in the conduit 31 higher and higher, until the solution—upon the attainment of a predetermined concentration as a result of the choice of the heights $(h_x, h)$, hereinafter more fully dealt with—will pass into the evaporator 14 or into the intermediate vessel 32. As the absorption liquid contained in the conduit 17 has a heavier specific gravity than the condensate passing through the conduit 30, the weight of the column of liquid contained in the conduit above the point at which the conduit 30 enters will be the lighter, the smaller the amount of absorption solution, contained in the liquid mixture forming the said column. This is so because the conduits 30 and 31 on the one hand constitute a U-shaped pipe, in the portion 30 of which the condensate may be lifted so high as to allow it at all events to pass into the conduit 31, and on the other hand, the portion of the conduit 5 communicates with the conduit consisting of the portions 17, 31 and forms a second U-shaped pipe. The lower portion 17 contains substantially undiluted absorption solution, whereas the upper portion 31 a mixture of condensate and absorption solution. The condition of equilibrium, which is established as soon as the liquid mixture passes into the evaporator 14, is brought about by the fact of the specific gravity of the solution in the conduit 31, diluted by the condensate, is just so light as to cause the column to extend within the conduit 31 as far as the point at which the latter enters the intermediate vessel 32. This maintains the undiluted solution of heavier specific gravity in the upper portion of the conduit 5 leading to the absorber 6 in equilibrium, so that by virtue of the specific gravity, the degree of concentration of the mixture passing into the evaporator will, therefore, be determined. As will be apparent from Figure 3 the degree of concentration of the mixture corresponds to the heights $h$ and $h_x$. Here $h$ denotes on the one hand the difference in level between the point at which the conduit 30 terminates in the pipe 17 and on the other hand the point at which the conduit 5 terminates in the absorber 6, and $h_x$ the difference in level between the last-mentioned point and the point from which the condensate or liquid mixture passing through the connecting pipe 33 flows into the evaporator 14. If $s$ denotes the specific gravity of the absorption solution contained in the conduit 5 and $\sigma$ the specific gravity of the liquid mixture contained in the pipe 31, the relation $h.s=(h+h_x).$ holds good for the condition of equilibrium. It follows that $$h_x = h \cdot \frac{(s-\sigma)}{\sigma} \quad \sigma = \frac{s.h}{h+h_x}$$

For a given concentration of the absorption solution corresponding to a certain value of the specific weight $s$, the heights $h$ and $h_x$ may, consequently, be easily chosen so that the specific weight of the liquid mixture contained in the conduit 31 has a predetermined value and the said liquid mixture possesses a determined degree of concentration of the absorption solution. In this way, it is possible to charge the evaporator continuously and uniformly with an accurately concentrated liquid mixture, the concentration of said mixture being substantially independent of the greater or smaller intensity of the heat imparted or of the condenser cooling. The operation of the last-described device is such that the condensate will not freeze in the supply pipe leading to the evaporator, but this will be avoided because the intermediate vessel 32 and connecting pipe 33 always contain liquid mixed together with the absorption solution. Also in the conduit 30 and in the separating vessel 13, the condensate cannot freeze, because this is prevented by the pressure of the column of liquid prevailing in the intermediate vessel 32 as well as in the vessel 13.

The modified form of construction as disclosed in Figure 4 differs from that shown in Figure 3 in many respects in that above all, the absorption solution of the absorber system need not in general be utilized at all to form the liquid mixture for preventing the condensate from freezing. This may be attained by providing means to withdraw at the lower end of the evaporator liquid consisting of diluted absorption solution which has not been evaporated therein and to supply it again to the evaporator at a higher point thereof. To this end, the descending portion of the U-shaped conduit 40 is connected to the lower end of the evaporator 14, the rising portion of the U-shaped conduit 40 leading to the intermediate vessel 41, facing the evaporator 14, whence the fluid flows through the connecting pipe 42 to a higher point of the evaporator 14. A vapor conduit 44, connected to the separating member 13 disposed in the condensate pipe system between the evaporator 14 and the condenser 8, and corresponding to the conduit 19 of Figure 3, terminates in a vessel-like enlargement 43 inserted in the rising portion of the pipe 40 and which is dsigned for preventing the separating vessel 13 from freezing.

Furthermore, two condensate conduits are connected to the intermediate vessel 41 and enter at points below the level of the column of liquid contained in the vessel 41. One of the condensate conduits (45) serves to connect the intermediate vessel 41 with the separating vessel 13 and the other (46) with the rising portion of the liquid conduit 17, which is branched off the absorber system and in which the liquid conduit 46 terminates at a point which lies so low below the level of the column of liquid standing above the said point and formed of the absorption solution contained in the conduit 17 that the condensate supplied, if desired, through the pipe 46, may lift a small quantity of the absorption solution within the intermediate vessel 41.

At the lower end of the conduit 17 a reversely bent conduit 47 is provided, the object being merely to extend the conduit so far as to prevent fluctuations of pressure from causing a mixing of the solutions of a different degree of concentration, which fluctuations may, for instance, be transmitted from the separator 4 through the conduit 5 and cause the fluid contained in the conduits 5 and 17 to oscillate. The evaporator 14 may also operate below 0° C. without admixing the solution withdrawn from the absorber system, as the remaining solution of the evaporator 14 is again supplied to the latter as well as to the intermediate vessel 41 by the repeated operating cycles. The condensate mixes with the diluted solution in the intermediate vessel 41 and passes into the evaporator 14 by by-passing the pipe 46 and without adding any additional amount of absorption solution. If the concentration of the remaining solution should be in the meantime too weak, in view of the corresponding temperature prevailing in the evaporator 14, the condensate in the intermediate vessel 41 may yet freeze. In this case, the condensate will pass through the lower end of the intermediate vessel 41 and through the conduit 46 into the rising conduit 17, because, at first, only the upper portion of the quantity of liquid, contained in the vessel 41 will freeze. The condensate mixed with the absorption solution will thereby enter at the upper end of the intermediate vessel 41, thus causing the ice layer to thaw off again. Should the defrosting process not take place in a sufficiently rapid manner, a further amount of the liquid mixture will flow into the intermediate vessel 41 through the conduit 17 and descend, in the event of it not being capable of evaporating in the vessel 41, through the U-shaped conduit 40 into the pot-like vessel 43 in order to mix with the liquid mixture contained therein, whence it is again conveyed to the intermediate vessel 41, as well as to the evaporator 14. As long as the freezing process of the condensate continues in the intermediate vessel 41, a small additional amount of absorption solution will be supplied to the evaporator 14 through the conduit 17. As soon as the passage through the intermediate vessel 41 is unobstructed, the supply of a further quantity of solution from the absorption system to the evaporator 14 will cease, and the absorption solution contained in the evaporator 14 will be caused to merely circulate. Should the absorption solution be strongly concentrated so as to influence the evaporation thereof, the solution circulating within the evaporator 14 will, owing to continued admixing of the condensate, be soon again diluted, until a portion of the fluid contained in the evaporator 14 passes into the absorber 6. At all events, the suitable mixture of condensate and absorption solution is, therefore, effected automatically in the case of a proper operation of the evaporator corresponding to the temperature prevailing therein.

Having thus described my invention what I claim is:

1. The step in the process, by which a refrigerant is expelled from an absorption solution, then condensed, evaporated and again absorbed, which consists in maintaining in the evaporator a mixture of refrigerant condensate and of a comparatively slight amount of absorption solution added thereto from an available supply in the absorption system, the amount of absorption solution to be added to the condensate rising into a vessel disposed in the conduit leading from the condenser to the evaporator by the vapor of the refrigerant from a point lying below the level of a column of liquid formed of the absorption solution, said vapor being developed from the condensate under a pressure lying between that of condensation and evaporation.

2. The step in the process, by which a refrigerant is expelled from an absorption solution, then condensed, evaporated and again absorbed, which consists in maintaining in the evaporator a mixture of refrigerant condensate and of a comparatively slight amount of absorption solution added thereto from an available supply in the absorption system, the amount of absorption solution to be added to the condensate rising into the evaporator through a fluid agent operating in the absorption system, the absorption solution to be added to the condensate being brought to mix with the condensate at a point which lies so low below the level of a column of liquid formed of the absorption solution as to cause the condensate to convey to the evaporator small amounts of absorption solution.

3. The step in the process, by which a refrigerant is expelled from an absorption solution, then condensed, evaporated and again absorbed, which consists in maintaining in the evaporator a mixture of refrigerant condensate and of a comparatively slight amount of absorption solution added thereto from an available supply in the absorption system, the mixture consisting of condensate and fluid not evaporated in the evaporator being withdrawn from the bottom of said evaporator and again conveyed to a higher point of said evaporator.

4. In an absorption refrigerating apparatus comprising a generator, a condenser, an evaporator and an absorber, fluid conduits between the generator and absorber forming a circulating system for the absorption solution, a fluid conduit leading from the condenser to the absorber, a vessel inserted in said conduit, and a vapor conduit leaving the upper part of said vessel and terminating in a conduit leading to the evaporator below the level of the column of liquid contained in said conduit.

5. In a refrigerating absorption apparatus comprising a generator, a condenser, an evaporator and an absorber, fluid conduits connecting the generator and absorber for establishing a circulation of the absorption solution through said vessel, a condensate conduit connecting the condenser with the evaporator, and a further conduit connecting the said fluid circulating system with the last-mentioned conduit, said fluid conduit terminating in said condensate conduit at a point which is so low that the condensate of lighter specific gravity may raise the absorption solution of heavier specific gravity to the point at which the condensate enters the evaporator.

6. In an absorption refrigerating apparatus comprising a generator, a condenser, an evaporator and an absorber, fluid conduits between the generator and absorber forming a circulating system for the absorption solution, a fluid conduit leading from the condenser to the absorber, a vessel inserted in said conduit, a further conduit connecting said fluid circulating system with the last-mentioned conduit, said fluid conduit terminating in said condensate conduit at a point which is so low that the condensate of lighter specific gravity may rise the absorption solution of heavier specific gravity to the point at which the condensate enters the evaporator, and a vapor conduit leaving from the upper part of said vessel and terminating in the condensate conduit below the level of a permanent column of liquid.

7. In an absorption refrigerating apparatus comprising a generator, a condenser, an evaporator and an absorber, fluid conduits between the generator and absorber forming a circulating system for the absorption solution, a fluid conduit leading from the condenser to the absorber, a vessel inserted in said conduit, said vessel being disposed between said condenser and said evaporator so as to develop vapor in said vessel from the condensate under a pressure lying between the pressure of condensation and evaporation, and a U-shaped conduit, the descending portion of which being connected to the lower end of the evaporator and in the rising portion of which leading to a higher situated point of the evaporator terminates a vapor conduit leaving said vessel inserted between said condenser and said evaporator, said U-shaped conduit having a pot-like enlargement in its rising portion above the point at which the vapor conduit enters.

8. In an absorption refrigerating apparatus comprising a generator, a condenser, an evaporator and an absorber, fluid conduits between the generator and absorber forming a circulating system for the absorption solution, a fluid conduit leading from the condenser to the absorber, a vessel inserted in said conduit, said vessel being disposed between said condenser and said evaporator so as to develop vapor in said vessel from the condensate under a pressure lying between the pressure of condensation and evaporation, and a U-shaped conduit, the descending portion of which being connected to the lower end of the evaporator and in the rising portion of which leading to a higher situated point of the evaporator terminates a vapor conduit leaving said vessel inserted between said condenser and said evaporator, said U-shaped conduit having a pot-like enlargement in its rising portion above the point at which the vapor conduit enters, two condensate conduits, one of which terminates in an intermediate vessel below a column of liquid, said vessel being inserted between the condensate conduit system and the evaporator, whereas the other enters the rising portion of the U-shaped conduit containing absorption solution at a point lying so low below the level of the column of liquid formed of the absorption solution as to cause the condensate to rise the absorption solution into said intermediate vessel in the event of the liquid contained in said vessel being frozen.

9. In an absorption refrigerating apparatus comprising a generator, a condenser, an evaporator and an absorber, fluid conduits connecting the generator and absorber for establishing a circulation of the absorption solution through said vessel, a condensate conduit connecting the condenser with the evaporator, and a further conduit connecting the said fluid circulating system with the last-mentioned conduit, said fluid conduit terminating in said condensate conduit at a point which is so low that the condensate of lighter specific gravity may rise the absorption solution of heavier specific gravity to the point at which the condensate enters the evaporator, the difference in level between the point at which the absorption solution enters the absorber and the point at which the condensate mixes with the absorption solution on the one hand, and the difference in level between the last-said point and the point at which the fluid mixture enters the evaporator on the other hand being such that the two said differences in level are proportional to the ratio of the desired specific gravity of the fluid mixture to be conveyed to the evaporator to the given specific gravity of the absorption solution rising into the absorber.

10. In a refrigerating process in which a refrigerant is expelled from an absorption solution, then condensed, evaporated and again absorbed, the method of preventing the refrigerant from freezing in the evaporator or in a conduit conveying the refrigerant to the evaporator which includes the step of maintaining in said evaporator or said conduit a mixture of refrigerant condensate and of a comparatively slight amount of absorption solution added thereto from an available supply in the absorption system, said mixture having a lower freezing point than the freezing point of said refrigerant, and the amount of absorption solution added to the condensate being derived from the body of the absorption solution circulating between the generator and the absorber of the absorption system.

11. In a refrigerating process in which a refrigerant is expelled from an absorption solution, then condensed, evaporated and again absorbed, the method of preventing the refrigerant from freezing in the evaporator or in a conduit conveying the refrigerant to the evaporator which includes the step of maintaining in said evaporator or said conduit a mixture of refrigerant condensate and of a comparatively slight amount of absorption solution added thereto from an available supply in the absorption system, said mixture having a lower freezing point than the freezing point of said refrigerant, and the amount of absorption solution added to the condensate being derived from the absorption solution which is being conveyed to the absorber.

EDMUND ALTENKIRCH.